(12) United States Patent
Nojima et al.

(10) Patent No.: US 8,109,286 B2
(45) Date of Patent: Feb. 7, 2012

(54) FUEL TANK INCLUDING MOVABLE OR DEFORMABLE FUEL CHAMBER AND WASTE CHAMBER

(75) Inventors: Masafumi Nojima, Tokai (JP); Takao Ishikawa, Hitachi (JP); Hiroshi Kanemoto, Hitachinaka (JP); Takeyuki Itabashi, Yasugi (JP)

(73) Assignee: Hitachi, Ltd., Tokyo (JP)

( * ) Notice: Subject to any disclaimer, the term of this patent is extended or adjusted under 35 U.S.C. 154(b) by 851 days.

(21) Appl. No.: 11/836,874

(22) Filed: Aug. 10, 2007

(65) Prior Publication Data
US 2008/0052994 A1 Mar. 6, 2008

(30) Foreign Application Priority Data
Aug. 31, 2006 (JP) .................................. 2006-234830

(51) Int. Cl.
F17B 1/00 (2006.01)
(52) U.S. Cl. .................... 137/259; 137/255; 429/515
(58) Field of Classification Search .................. 137/259, 137/255; 429/515
See application file for complete search history.

(56) References Cited

U.S. PATENT DOCUMENTS

| | | | | |
|---|---|---|---|---|
| 3,635,200 | A * | 1/1972 | Rundell et al. | 123/3 |
| 4,850,859 | A * | 7/1989 | Kesten et al. | 431/328 |
| 7,316,719 | B2 * | 1/2008 | Devos | 48/197 R |
| 2004/0048115 | A1* | 3/2004 | Devos | 429/19 |
| 2004/0067394 | A1 | 4/2004 | Sadamoto | |
| 2005/0238553 | A1 | 10/2005 | Kuroda | |
| 2006/0127731 | A1* | 6/2006 | Faris | 429/34 |

FOREIGN PATENT DOCUMENTS

| | | |
|---|---|---|
| EP | 1 081 780 | 3/2001 |
| EP | 1 306 917 | 5/2003 |
| JP | 2002 020101 | 7/2000 |
| JP | 2000-304194 | 11/2000 |
| JP | 2004-250059 | 9/2004 |
| WO | WO 2005/053832 | 6/2005 |

OTHER PUBLICATIONS

JP Office Action of Appln. No. 2006-234830 dated Oct. 11, 2011 with partial English language translation.

* cited by examiner

*Primary Examiner* — Kevin Lee
(74) *Attorney, Agent, or Firm* — Antonelli, Terry, Stout & Kraus, LLP.

(57) ABSTRACT

In a fuel tank for containing a hydrogen storing material and a product generated by dehydrogenation reaction of the hydrogen storing material, comprising, a fuel chamber for containing the hydrogen storing material, a waste chamber for containing the product, and a tank envelope for containing the fuel chamber and the waste chamber, the fuel tank further comprises a partition wall fluidly separating the fuel chamber and the waste chamber from each other and being movable to change a ratio in volume between the fuel chamber and the waste chamber, and each of the fuel chamber and the waste chamber has a valve to be hermetically closed.

12 Claims, 8 Drawing Sheets

FUEL TANK INCLUDING MOVABLE OR DEFORMABLE FUEL CHAMBER AND WASTE CHAMBER

BACKGROUND OF THE INVENTION

The present invention relates to a fuel tank, particularly a tank for storing and transferring a fuel as a carrier for hydrogen.

Hydrogen is considered to be an auspicious energy source of substitute for petroleum oil under an increase in importance of global warming or energy security. On the other hand, there is a problem of that hydrogen is gaseous matter under normal temperature and normal pressure and is easily ignited. Therefore, a development of method for safely storing hydrogen if high density and a development of system for supplying and utilizing hydrogen are needed.

As a device for utilizing hydrogen as fuel, a fuel cell attracts attention. Hydrogen is used as fuel in the fuel cell, but it is difficult for hydrogen as fuel to be safely and stably supplied. A fuel cell for an automobile needs to be of small size and of light weight, of a long cruising distance per one fuel-charge, of easy handling on charging, or the like, and various supply methods for these requirements are proposed.

For examples as methods for storing and supplying hydrogen, hydrogen is directly supplied from compressed hydrogen or liquefied hydrogen, supplied from a hydrogen absorbing member such as hydrogen absorbing alloy, carbon nanotube or the like, or is generated by reforming a methanol, hydrocarbon or the like as hydrogen compound storing hydrogen. As the method of directly supplying hydrogen from the compressed hydrogen, a fuel cell automobile of compressed hydrogen type can be now realized by a development of weight-saving and pressure-proof of high pressure hydrogen gas container, but there is a problem in safety to be kept during and after charging while increasing a compression ratio of hydrogen to increase the cruising distance. Therefore, a safety technique for preventing hydrogen from exploding and restraining temperature from increasing is developed. The method of reforming hydrocarbon to generate hydrogen attracts attention, because it is useable during a long term while keeping the conventional sources on a transition from petroleum fuel to hydrogen fuel. However, high temperature necessary for the reforming causes radical reaction, so the reforming is utilized only experimentally.

On the other hand, as a substitute for the above methods, inorganic or organic hydride as hydrogen storing material of high hydrogen absorbing performance attracts attention in recent years. The hydrogen storing material is of liquid under normal temperature, and has the same physical properties as the gasoline so that the conventional infrastructure for the petroleum fuel is partially useable. Further, an explosibility thereof is relatively lower than the other hydrogen fuel, so it is effective for decreasing the cost and increasing the safety for supplying. As a feature of the hydrogen storing material, a compound as dehydrogenation product as well as hydrogen are generated on the dehydrogenation reaction. The compound as dehydrogenation product is repeatedly useable to be mixed with hydrogen and to be removed from hydrogen so that the cost for supplying the hydrogen storing material can be decreased. However, an infrastructure for reusing the compound as dehydrogenation product in the conventional fuel hydrogen utilizing device does not exist. Therefore, a user of the hydrogen storing material must correct the compound as dehydrogenation product. There is a problem for decreasing the size and the space of a tank for correcting the compound as dehydrogenation product. JP-A-2004-250059 discloses a partitioned tank for solving the above problem.

BRIEF SUMMARY OF THE INVENTION

In a case where a fuel chamber and a waste liquid chamber are elastic bags in the tank of JP-A-2004-250059, there is a provability of that the fuel or waste liquid leaks out from the bag resiliently deformable. Further, in the tank of JP-A-2004-250059, a pump is arranged on a part of a pipe for collecting the waste liquid so that a pump is used to take the fuel from a fuel supply device into the tank and another pump is used to take the waste liquid out of the tank. Further, an electric power supply for the pumps are necessarily used to increase a size of the tank.

Further, in the tank of JP-A-2004-250059, the waste liquid cannot be wholly discharged when the fuel does not fill the tank. An object of the present invention is to provide a fuel tank which enables an energy to be effectively used for charging the tank with the fuel and discharging the fuel from the tank, and can be easily handled to solve the above problems.

According to the invention, in a fuel supply system for using an organic hydride for storing hydrogen chemically and dehydrogenation with generating the waste liquid, a waste chamber and a fuel chamber is arranged on the fuel tank to decrease a size of the tank and enables the tank to close a fuel supply pipe and a waste liquid discharge pipe with valves so that the energy is effectively used for charging the tank with the fuel and discharging the fuel from the tank, and the tank can be easily handled A fuel tank of the invention for containing a hydrogen storing material and a product generated by dehydrogenation reaction of the hydrogen storing material, comprises, a fuel chamber for containing the hydrogen storing material, a waste chamber for containing the product, and a tank envelope for containing the fuel chamber and the waste chamber, characterized in that the fuel tank further comprises a partition wall fluidly separating the fuel chamber and the waste chamber from each other and being movable to change a ratio in volume between the fuel chamber and the waste chamber, and each of the fuel chamber and the waste chamber has a valve to be hermetically closed.

According to the invention, in a hydrogen utilizing technique using a hydrogen storing material, a fuel and a waste liquid are contained in a decreased volume to make a hydrogen utilizing device such as an automobile or a stationary fuel cell compact.

Other objects, features and advantages of the invention will become apparent from the following description of the embodiments of the invention taken in conjunction with the accompanying drawings.

DETAILED DESCRIPTION OF THE INVENTION

Figure 1:
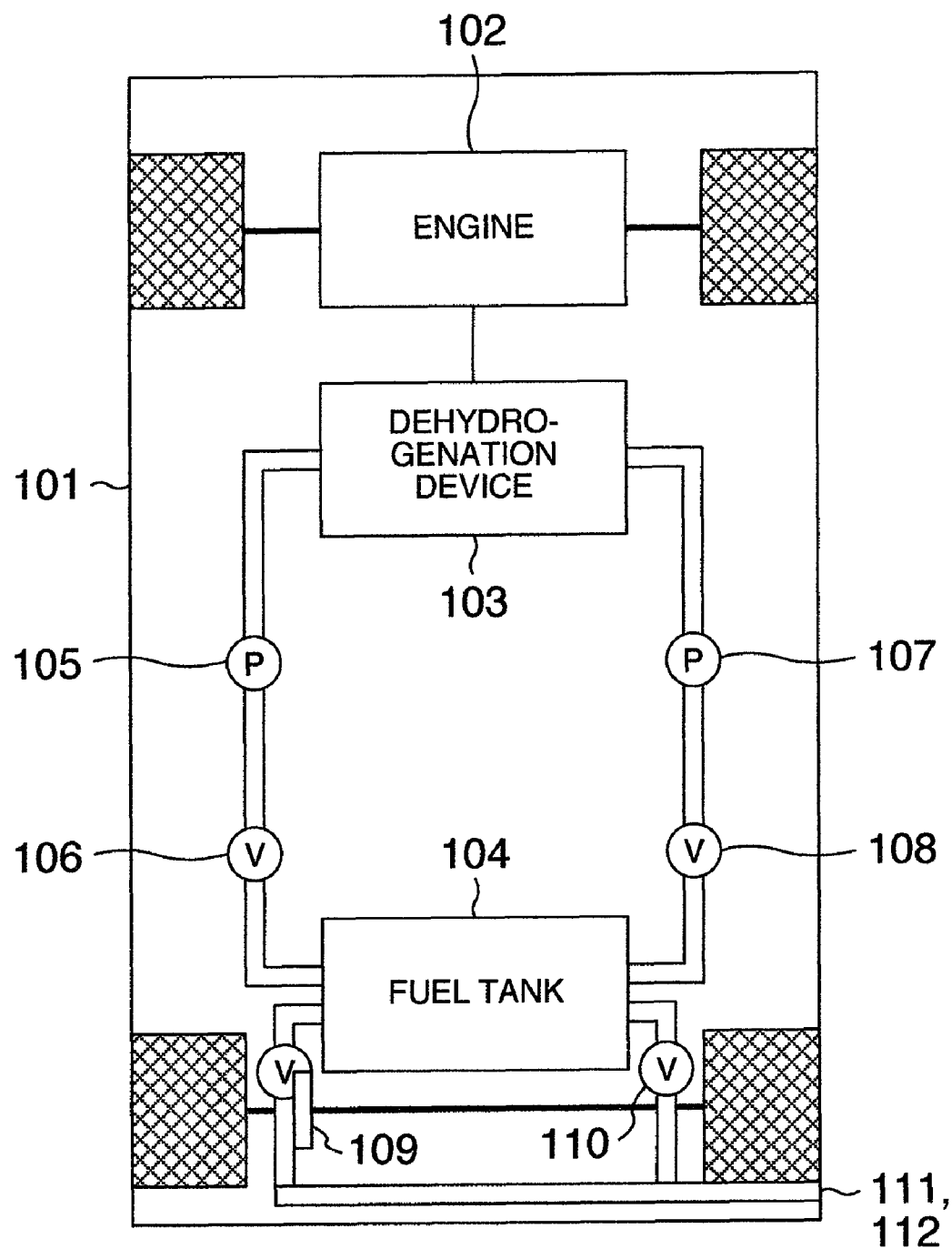
FIG. 1 is a schematic view showing a hydrogen engine automobile having a fuel tank for automobile.

A device using a fuel tank of the invention may be an automobile using hydrogen as a power source, or a stationary electric generator, as well as a fuel storage tank in a fuel supplier, a fuel container of a transport equipment for transporting the fuel, or the like.

When the inorganic or organic hydride is used as the hydrogen supply source, a system for extracting the hydrogen is needed. The system for extracting the hydrogen necessarily includes a dehydrogenation device for extracting the hydrogen from a hydrogen supply source (fuel), a fuel tank for containing the hydrogen supply source as the fuel, a waste liquid tank for containing a dehydrogenation product (waste liquid) as a remainder of the hydrogen supply source separated from the hydrogen by the dehydrogenation. The dehydrogenation device includes a catalyst including a metallic catalyst and a catalyst carrier, the metallic catalyst includes at least one selected from a group consisting of nickel, palladium, platinum, rhodium, iridium, ruthenium, molybdenum, rhenium, tungsten, vanadium, osmium, chrome, cobalt and iron, the catalyst carrier includes at least one selected from a group consisting of alumina, zinc oxide, silica, zirconium oxide, diatomite, niobium oxide, vanadium oxide, activated carbon, zeolite, antimony oxide, titanium oxide, tungsten oxide and iron oxide. The hydrogen storage material is an aromatic compound including at least one of benzene, toluene, xylene, mesitylene, naphthalene, methylnaphthalene, anthracene, biphenyl, phenathlene and an alkyl derivative substitution of at least one of these, an aqueous ammonia, an aqueous hydrazine, and sodium borate. Further, a mixture of the aqueous ammonia or hydrazine and a hydrogen peroxide solution is used as an oxygen-hydrogen storage material for the fuel. When cyclohexane as the hydrogen storage material is sprayed on a catalyst layer in the hydrogen supply device, the cyclohexane ($C_6H_{12}$) is decomposed into hydrogen ($3 \times H_2$) and benzene ($C_6H_6$) by a cooperation of the catalyst and a thermal energy. The hydrogen and the benzene are separated by a demarcation membrane to a liquid of the benzene as the waste liquid to be collected into the fuel tank and a gaseous matter of the hydrogen as the fuel to be supplied to the fuel cell or engine. There is a provability of that the collected waste liquid includes the cyclohexane yet including the hydrogen. By adding the hydrogen ($3 \times H_2$) into the waste liquid (benzene ($C_6H_6$)) collected in a collecting tank 20, the cyclohexane ($C_6H_{12}$) as the hydrogen storage material is regenerated. On the other hand, the system for extracting the hydrogen necessarily includes the waste tank as well as the fuel tank, that is, a plurality of the tanks are necessarily included by an equipment for using the fuel. Therefore, in a case where the system is used in the equipment such as an automobile in which a space for containing the tanks is small, a volume of each of the tanks is necessarily a half of the conventional volume to make the cruising distance short, and increase a frequency of fuel supply so that a burden of a user is increased. Further, the fuel needs to be pumped up from the waste liquid tank differently from the conventional tank, so that a dispenser of a service station or the equipment necessarily includes an additional pump to cause an increase of the cost. According to the invention for solving the above problems, the following fuel tank is provided.

A fuel tank for containing a hydrogen storing material and a product generated by dehydrogenation reaction of the hydrogen storing material, comprises, a fuel chamber for containing the hydrogen storing material, a waste chamber for containing the product, and a tank envelope for containing the fuel chamber and the waste chamber, wherein the fuel tank further comprises a partition wall fluidly separating the fuel chamber and the waste chamber from each other and being movable to change a ratio in volume between the fuel chamber and the waste chamber, and each of the fuel chamber and the waste chamber has a valve to be hermetically closed.

In the fuel tank, at least one of an elastic member, a metallic spring, a rubber spring and a pneumatic spring connects the partition wall and the tank envelope to each other so that a spring height thereof is variable in a direction in which the partition wall is moveable.

A fuel tank for containing a hydrogen storing material and a product generated by dehydrogenation reaction of the hydrogen storing material, comprises, a fuel chamber for containing the hydrogen storing material, a waste chamber for containing the product, and a spacer chamber for containing at least one of gaseous matter and liquid other than the hydrogen storing material and the product, wherein a partition wall fluidly separates the fuel chamber, the waste chamber and the spacer chamber from each other and is movable to change a ratio in volume among the fuel chamber, the waste chamber and the spacer chamber, and each of the fuel chamber, the waste chamber and the spacer chamber has a valve to be hermetically closed.

A fuel tank for containing a hydrogen storing material and a product generated by dehydrogenation reaction of the hydrogen storing material, comprises, an envelope, a fuel chamber arranged in the envelope to contain the hydrogen storing material, and an inner container including a waste chamber for containing the product, wherein each of the fuel chamber and the waste chamber includes an elastically deformable bag to define at least partially each of the fuel chamber and the waste chamber, and one of the fuel chamber and the waste chamber surrounds the other one of the fuel chamber and the waste chamber.

In the above tanks, the elastically deformable flexible bag may define at least partially an outer periphery of each of the chambers.

The above tank may includes a plurality of the waste chambers.

According to the invention, since the ratio in volume between the fuel chamber and the waste liquid chamber is variable, an amount of the fuel mountable on a limited space of the automobile or the like is maximized to increase the cruising distance of the automobile when the invention is applied to the automobile.

Further, since the tank is closed by the valve, a completely closed fuel supplying and collecting system is formed to enable an air to be prevented from being mixed with the waste liquid or fuel during the fuel charge and the waste liquid collecting and the waste liquid to be pushed out by a pressure for supplying the fuel. Further, the spacer chamber enables the tank to be prevented from being always filled so that the tank has a light weight. Further, the spacer chamber may be pressurized to apply the pressure to the fuel in the fuel chamber so that a pump for feeding the fuel from the tank to the catalyst layer is assisted or may be eliminated.

Further, the invention is applicable to a tank lorry for transporting the fuel to transport simultaneously a great amount of the fuel while collecting the waste liquid. Further, the invention is applicable to a fuel tank for a service station for containing the fuel and the waste liquid in a high density in a limited space.

The partition wall separating the fuel chamber and the waste liquid chamber from each other in the fuel tank is preferably formed of an elastic flexible member of high polymer material of alkali-resistance and solvent resistance. When the inorganic hydride is used, the partition wall is preferably formed of natural rubber, styrene rubber, butyle rubber, ethylene, propylene rubber, nitrile rubber, polypropylene-methylpentene resin, fluorocarbon resin or the like of high alkali-resistance. When the organic hydride is used, the partition wall is preferably formed of fluorocarbon resin, fluorocarbon rubber, phenol resin or the like of solvent resistance. The material of the fuel tank of the invention is preferably of alkali-resistance and solvent resistance similarly to the partition wall. The material of the partition wall other than the above polymeric material may be a metallic material of stainless steel such as SUS304, SUS316 or the like, titanium or the like, an engineering plastic of high chemical resistance, a glass-carbonfiber composite material (FRP, carbon-FRP or the like), steel, aluminum, a composite material of ultralight alloy of improved corrosion resistance such as a magnesium alloy, or the like.

First Embodiment

FIG. 1 is a schematic view of a hydrogen automobile with a fuel tank for automobile as an embodiment of the invention. The hydrogen automobile 101 is activated as follows. A fuel (hydrogen storage material) is fed by a pump 105 from a fuel tank 104 to a dehydrogenation device 103 and subsequently sprayed onto a catalyst layer in the dehydrogenation device 103 to be decomposed into hydrogen and a dehydrogenation product (waste liquid) with a catalysis so that the hydrogen is supplied into an engine 102 to be burnt to generate an output power. The waste liquid is withdrawn into the fuel pump 104 by a pump 107.

Figure 2:
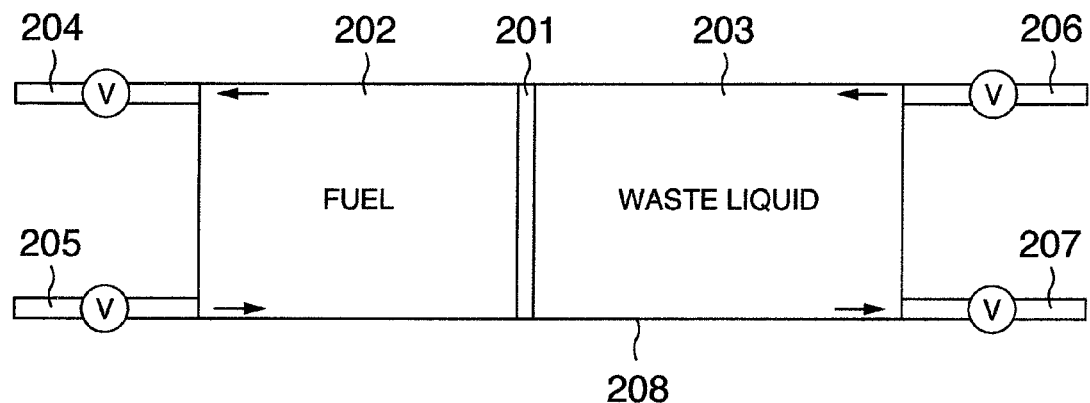
FIG. 2 is a schematic view showing an embodiment of the fuel tank of the invention.

FIG. 2 is a schematic view of an embodiment of the fuel tank of the invention. The fuel tank of the embodiment includes a tank frame 208 as an outer envelope of the fuel tank, a fuel chamber 202 for containing the fuel, a waste liquid chamber 203 for containing the waste liquid, a partition wall 201 connected to the tank frame, separating fluidly the fuel chamber and the waste liquid chamber from each other and moveable in accordance with an amount of each of the fuel and the waste liquid, pipes 204, 205, 206 and 207 for transporting the fuel and waste liquid with respect to the dehydrogenation device and a dispenser, and valves mounted on the pipes. The pipes are arranged to enable the partition wall to move desirably.

Figure 3:
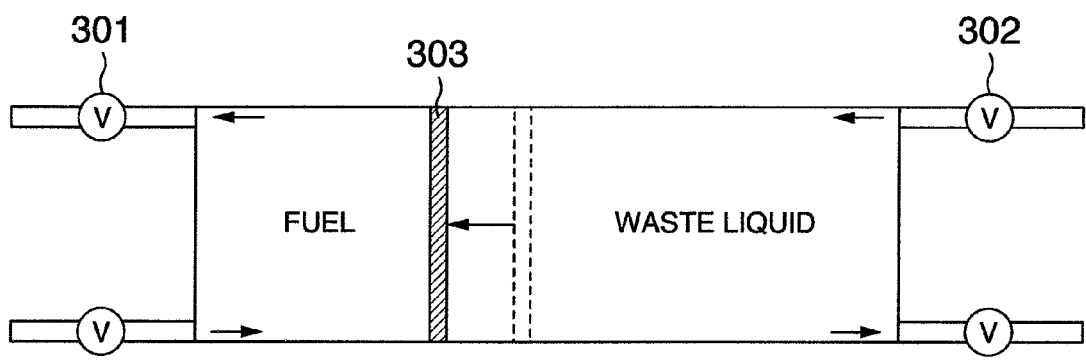
FIG. 3 is a schematic view showing an operation of the fuel tank of the invention.

A function of the fuel tank as the embodiment is described below with making reference to FIGS. 1-3. The pump 105 starts to feed the fuel to the catalyst so that the fuel is withdrawn from the fuel chamber when a suction pressure reaches a desired pressure to open a valve 301. The withdrawn fuel is fed to the dehydrogenation device. At the same time of this movement, the partition wall 303 moves leftward in the drawings in accordance with a decrease of the fuel in the tank. Therefore, a negative pressure is generated in the tank. The fuel is treated by dehydrogenation process on the catalyst layer to feed the hydrogen to the engine. The waste liquid simultaneously generated is collected in the tank by opening the valve 302. The suction force for collecting the waste liquid into the tank may be obtained from the suction pump 107 or alternatively obtained by the negative pressure generated in the tank to assist the pump or as the substitution for the pump as described above.

Further, when the fuel is supplied at the service station or the like, the fuel is supplied from a fuel supply port 111 and the waste liquid is collected from a waste liquid collecting port 112. The tank is charged with the fuel by attaching the fuel supply dispenser to the fuel supply port and attaching a waste liquid collecting dispenser to the waste liquid collecting port. It is preferable that a supply port of the fuel supply dispenser and the fuel supply port are hermetically sealed with respect to each other and a waste liquid collecting port of the waste liquid collecting dispenser and the waste liquid collecting port are hermetically sealed with respect to each other so that the fuel supply and the waste liquid collection are performed in high efficiency. Further, it is preferable that the fuel supply dispenser and the waste liquid collecting dispenser have respective gas dischargers for discharging gaseous matter from respective pipes.

Figure 4:
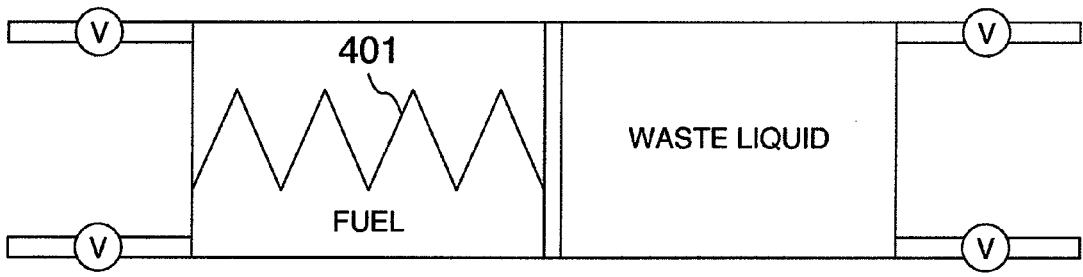
FIG. 4 is a schematic view showing another embodiment of the fuel tank of the invention.

Further, the fuel tank of the embodiment may have, as shown in FIG. 4, resilient members, metallic springs, rubber springs, air springs or the like 401 for fuel chamber and the waste liquid chamber respectively so that spring forces of the resilient members or springs push out the fuel (pull in the waste liquid) to eliminate the pump 105 for pulling out the fuel and the pump 107 for pulling in the waste liquid or assist these pumps.

Figure 5:
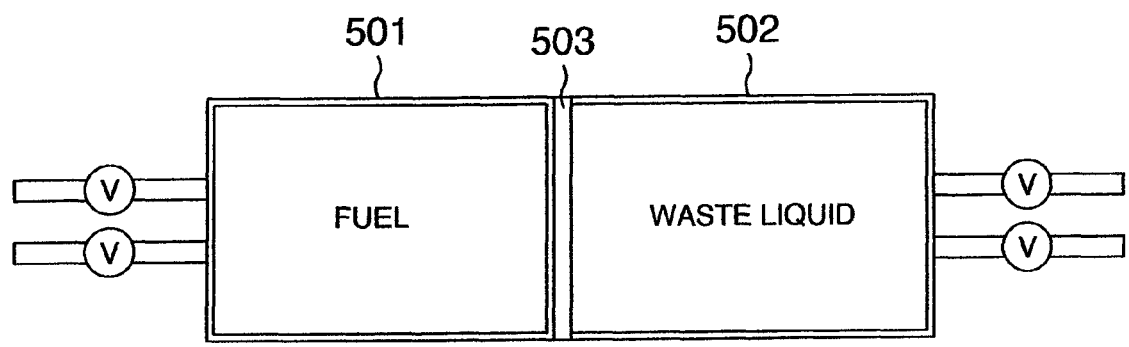
FIG. 5 is a schematic view showing another embodiment of the fuel tank of the invention.

Further, the fuel tank of the embodiment may have, as shown in FIG. 5, bags as a wall 501 of the fuel chamber and a wall 502 of the waste chamber. It is preferable for a material of the bags to be resilient material or high-polymer material of alkali resistance and solvent resistance. In such tank, the fuel and the waste liquid are contained by the bags respectively. It is preferable that a shape of the bag corresponds to a shape of inner wall of the tank frame and a part of outer periphery of the bag is adhered to the partition wall 503. It is preferable that the partition wall has a cross sectional shape corresponding to an inner wall of the tank frame and is movable vertically in accordance with an amount of the fuel.

Figure 6:
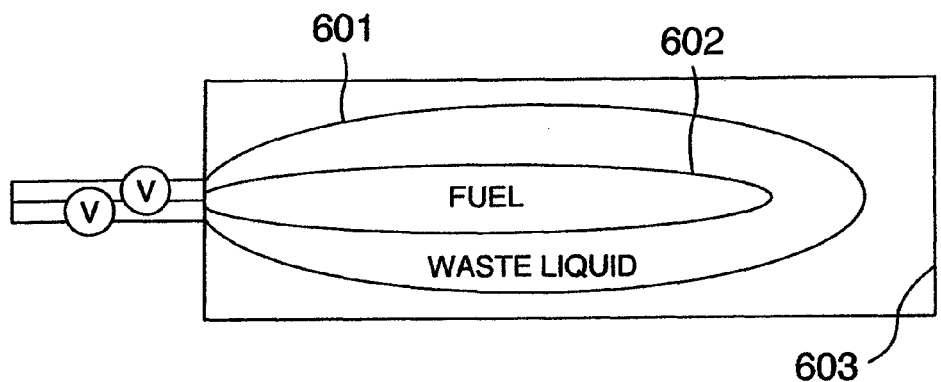
FIG. 6 is a schematic view showing another embodiment of the fuel tank of the invention having a bag structure.

The fuel tank of the embodiment may have, as shown in FIG. 6, the bags as the waste liquid chamber and the fuel chamber one of which surround the other one thereof. It is preferable that a material of at least an outer bag 601 is a resilient material of alkali resistance and solvent resistance. It is preferable that a deformed degree and an elastic force generated on the outer bag 601 by certain force is greater than those generated on an inner bag. The four pipes are connected to the waste chamber and the fuel chamber at respective positions distant from each other, but preferably the positions are not far away from each other.

Figure 7:
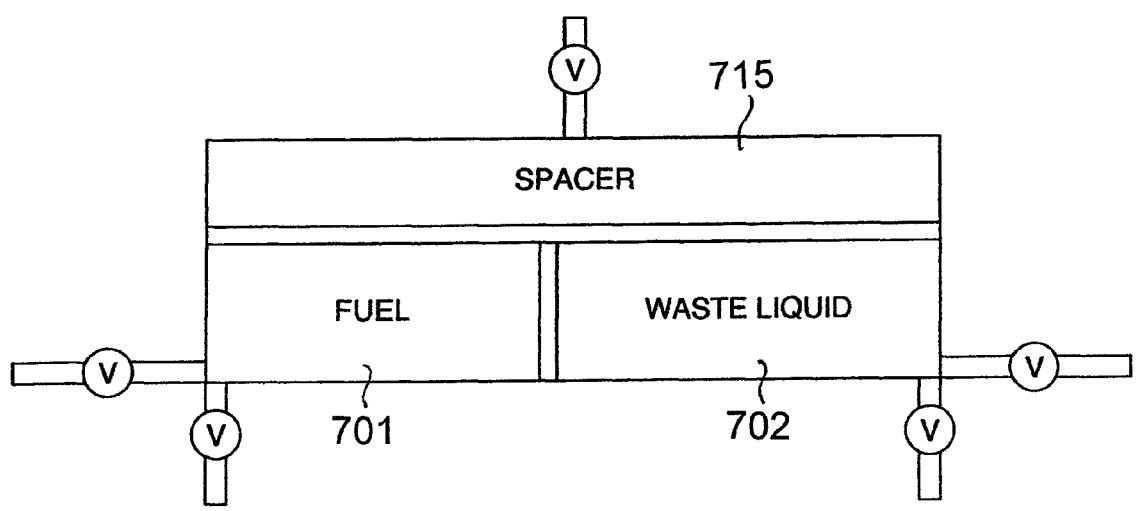
FIG. 7 is a schematic view showing another embodiment of the fuel tank of the invention having a spacer chamber.
Figure 8:
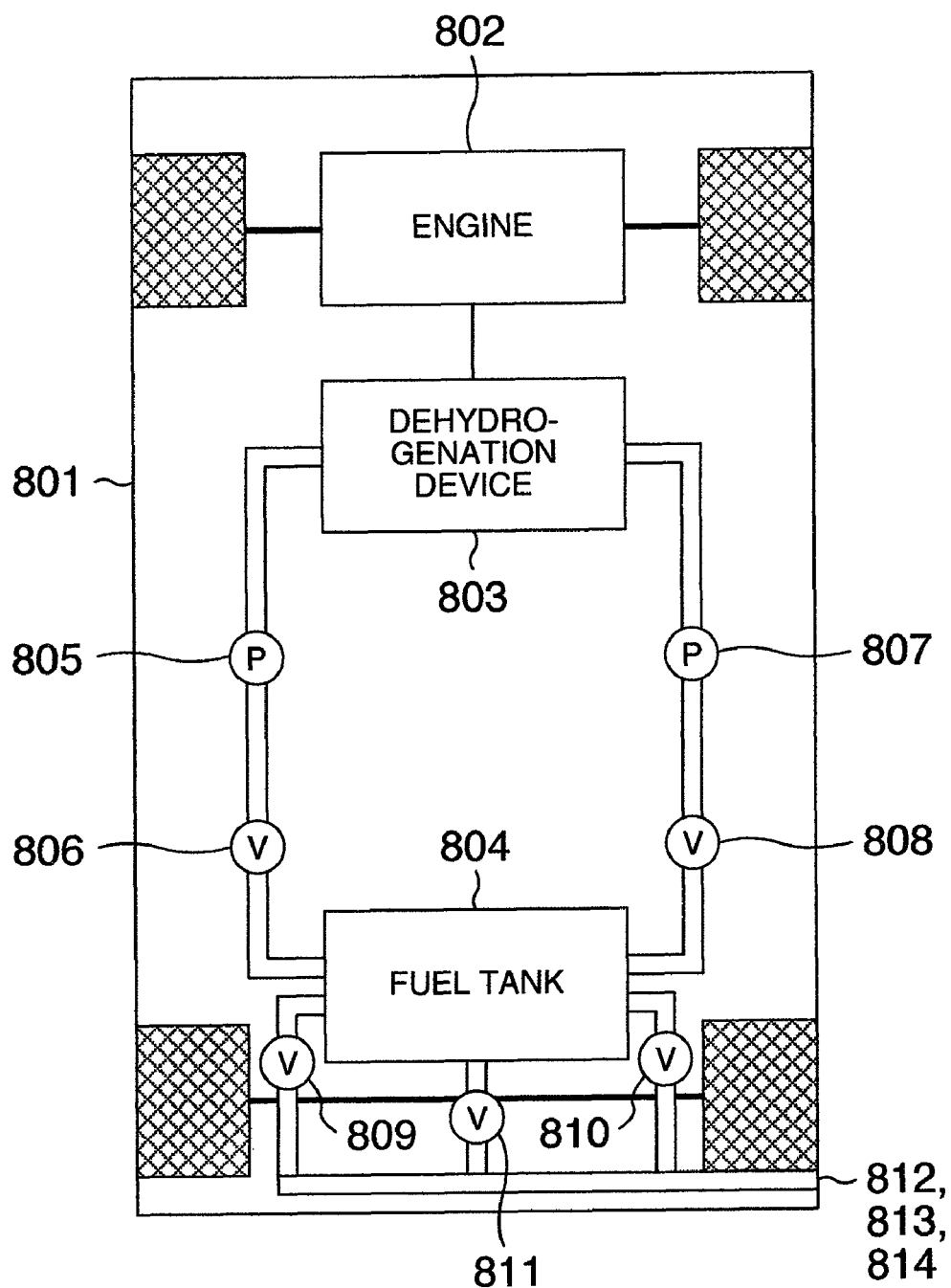
FIG. 8 is a schematic view showing a hydrogen engine automobile having the fuel tank with the spacer chamber of the invention.

The fuel tank of the embodiment may have, as shown in FIG. 7, the spacer chamber 715 as well as the waste chamber 702 and the fuel chamber 701, and preferably the spacer chamber 715, the waste chamber 702 and the fuel chamber 701 are the bags whose shapes correspond to the inner wall of the tank frame. Material of the bags are preferably resilient material or high-polymer material of alkali resistance and solvent resistance. The spacer chamber 715 contains compressed gaseous matter such as air, nitrogen, stable inert gas or the like. Single pipe is connected to the spacer chamber 715 to take in and out the gaseous matter. The pipe connected to the spacer chamber is, as shown in FIG. 8, connected to a spacer press-fitting port 814 arranged in the vicinity of the fuel supply port 812 and the waste liquid discharge port 813 and has a valve therebetween. It is preferable that the spacer press-fitting port 814 can be hermetically sealed with the dispenser for the gaseous matter supply and discharge similarly to the fuel supply port and the waste liquid collecting port. The gaseous matter is supplied into the spacer chamber 715 and is discharged from the spacer chamber 715 simultaneously with supplying the fuel and collecting the waste liquid at the service station, and an amount of the gaseous matter varies in accordance with an amount of the fuel to be supplied into the tank. The spacer chamber 715 presses the fuel chamber 701 and the waste liquid chamber 702 with the pressure of the gaseous matter when the tank is not filled with the fuel. The pressure of the gaseous matter in the spacer chamber 715 is applied to the fuel chamber 701 and the waste liquid chamber 702 to assist a feed of the fuel from the fuel chamber 701 to the dehydrogenation device. The valve arranged on the pipe connecting the waste liquid chamber 702 and the dehydrogenation device to each other is preferably a check valve.

Figure 9:
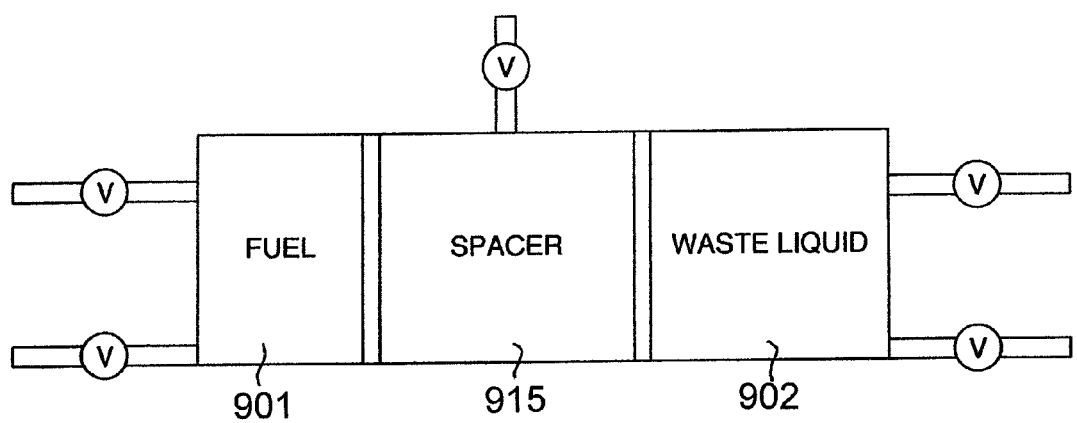
FIG. 9 is a schematic view showing another embodiment of the fuel tank of the invention having the spacer chamber.

As shown in FIG. 9, the spacer chamber 915 in the fuel tank may be arranged between the fuel chamber 901 and the waste liquid chamber 902.

Figure 10:
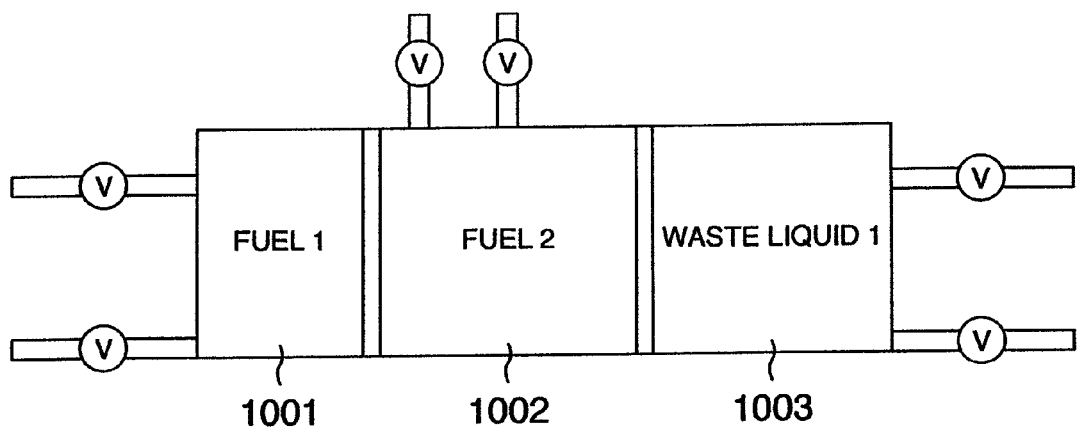
FIG. 10 is a schematic view showing an embodiment of the fuel tank of the invention with a plurality of the fuel chambers.
Figure 11:
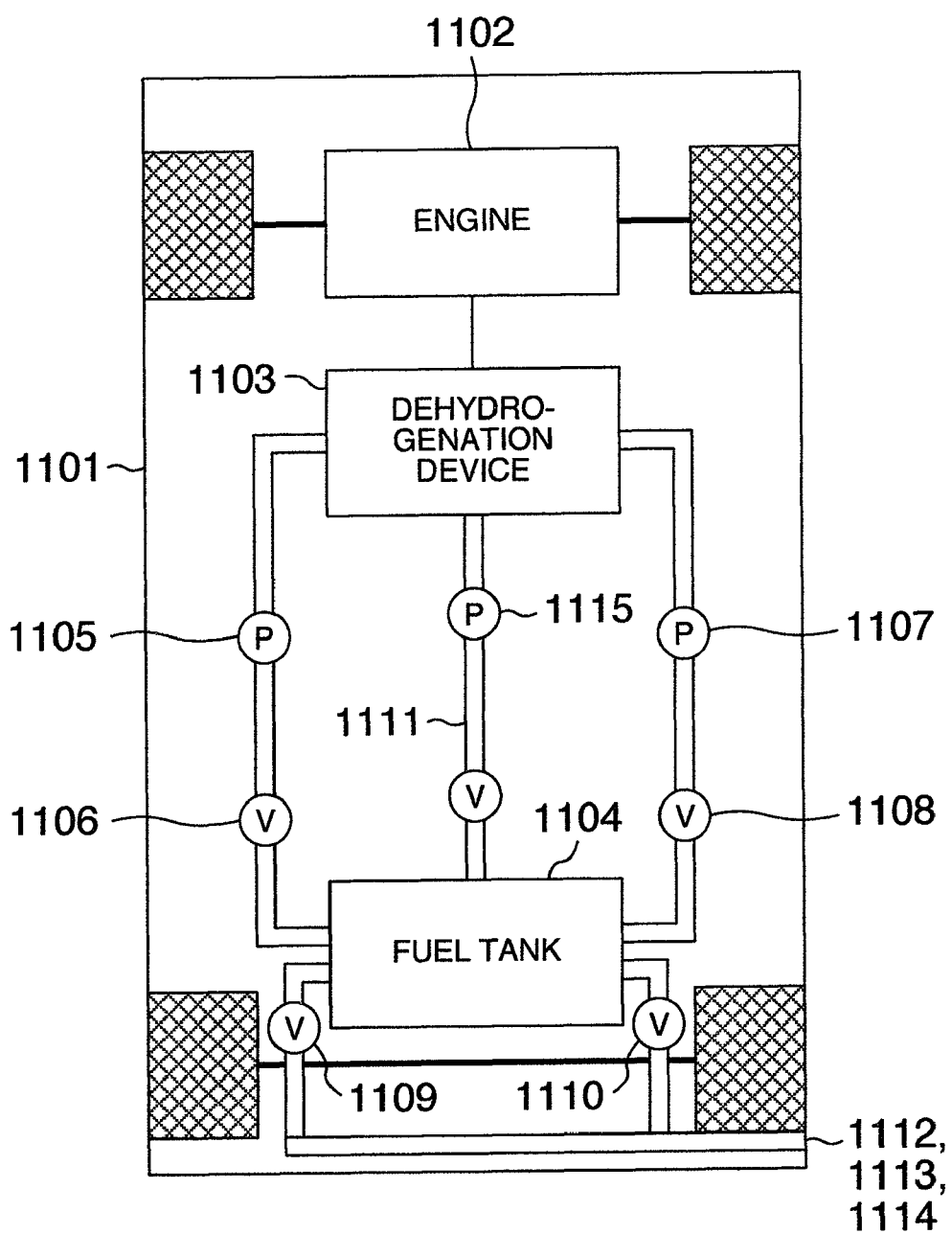
FIG. 11 is a schematic view showing a hydrogen engine automobile having the fuel tank with the plurality of the fuel chambers.

The fuel tank of the embodiment may have, as shown in FIG. 10, a plurality of the fuel chambers 1001 and 1002 and the waste liquid chamber 1003. FIG. 11 is a schematic view showing a hydrogen engine automobile with the tank. The tank with the plurality of the fuel chambers and the plurality of the waste liquid chambers is described with making reference to FIGS. 10 and 11. In FIG. 10, the fuel 1 is the hydrogen storage material such as methylcyclohexanone, and the fuel 2 is hydrogen (gaseous matter). The fuel 1 is transferred to the dehydrogenation catalyst as described above to be divided into the hydrogen to be supplied to the engine and the waste liquid to be transferred to the waste liquid chamber 1003. The hydrogen generated after an engine stop remains in the dehydrogenation device, so it is transferred by a pump 1115 to the fuel chamber 1002 to be stored therein. The fuel in the fuel chamber 1002 may be used to compensate an insufficient amount of the fuel when the engine is started or operates at high rotational speed.

The valves used in the embodiment may be check valves whose opening pressures are predetermined, but may be electrically energized valves whose openings are controlled by ECU (Electrical Control Unit) of the automobile.

Pipes 204 and 206 are connected to the dehydrogenation device, and pipes 205 and 207 are connected to the fuel supply port, the pipes 204 and 206 may be coaxially arranged, and the pipes 205 and 207 may be coaxially arranged. The embodiment may be applied to au automobile including a combination of the fuel cell and the motor as substitute for the hydrogen engine. When the embodiment is applied to the fuel cell automobile, the fuel tank with the spacer chamber as shown in FIGS. 7 and 9 may be used so that the spacer chamber and the fuel cell are connected by a pipe to enable the gaseous matter to be fed from the spacer chamber to the fuel cell when the fuel cell stops. In this case, the gaseous matter in the spacer chamber may include an inert gas such as helium, argon, neon or the like, or nitrogen gas.

It is preferable that the fuel chamber and the waste liquid chamber are stacked vertically.

Second Embodiment

Figure 12:
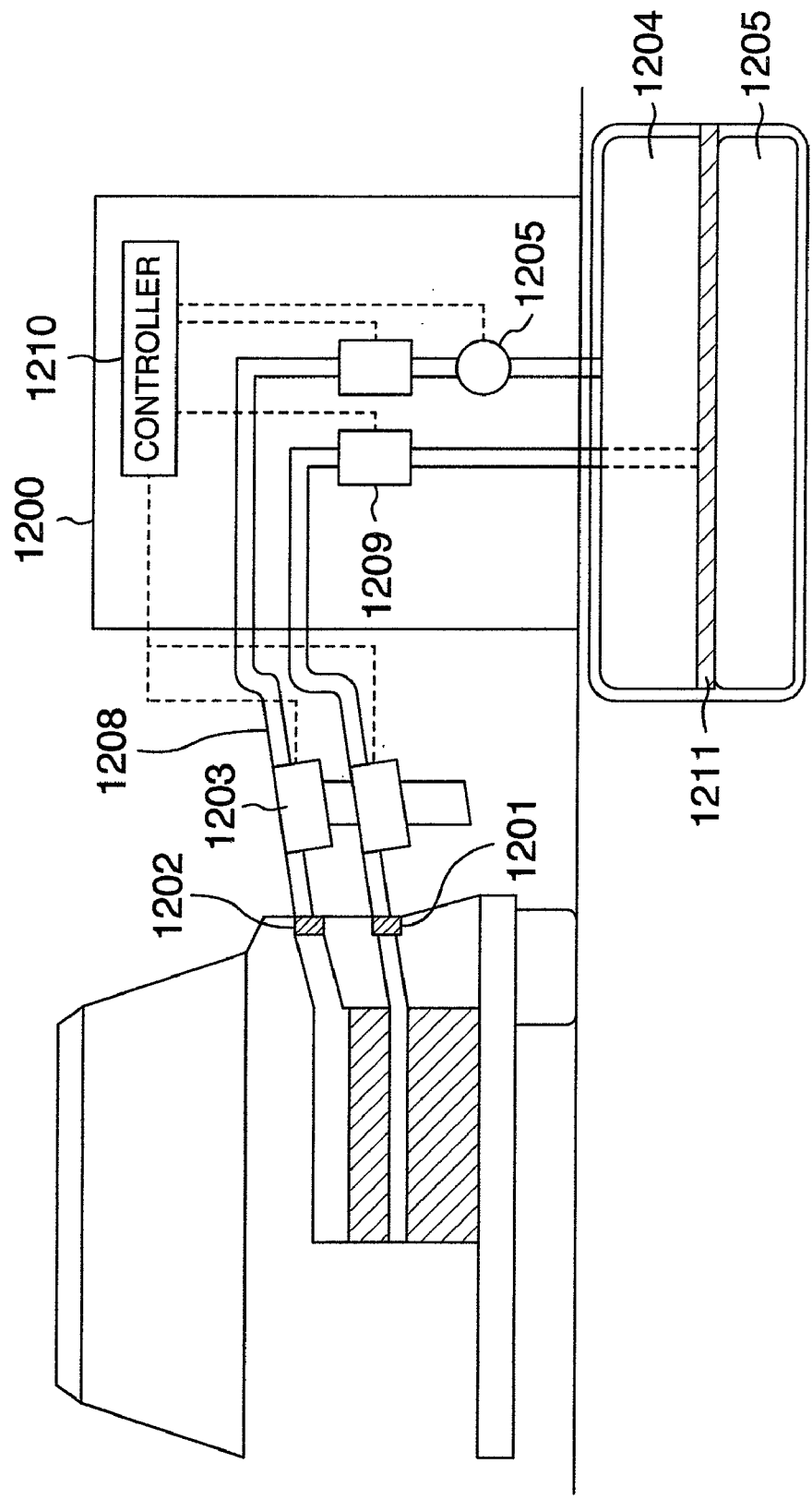
FIG. 12 shows the fuel tank arranged at a service station of the invention.

FIG. 12 is a schematic view showing a fuel tank of embodiment of the invention at the service station. The fuel tank at the service station is attached to the dispenser. Although only the fuel is taken out through the conventional dispenser for gasoline or diesel oil from the fuel tank at the dispenser side to be fed into the tank of automobile, the fuel tank for the hydrogen storage needs to store both of the hydride as the fuel and the waste liquid. Two tanks may be used easily, however, two pumps for supplying the fuel and collecting the waste liquid respectively are necessarily used.

The fuel tank of the embodiment enables only single pump to be used for the dispenser. As shown in FIG. 12, the hermetically sealed tank includes the fuel tank 1205 and the waste liquid tank 1206 preferably having respective bags. A movable partition wall 1211 is arranged between the fuel chamber and the waste liquid chamber to separate the fuel and the waste liquid from each other in the tank. The fuel chamber and the waste liquid chamber may be stacked vertically. In the embodiment, the waste liquid chamber is arranged below the fuel chamber.

A process for charging the fuel tank for automobile with the fuel and collecting the waste liquid through the dispensers including the fuel tank of the invention will be described. Incidentally, the automobile also has the fuel tank of the invention. It is preferable for both the fuel supply and the waste liquid collection to be performed simultaneously. At first, a fuel supply nozzle and a waste liquid collecting nozzle are set on the fuel supply port and the waste liquid discharge port respectively. Therefore, the fuel supply route and the waste liquid collecting route are connected to each other through the respective partition walls of the automobile fuel tank and the dispenser fuel tank so that a volume of the fuel in the automobile fuel tank increases in accordance with the fuel supply from the fuel supply port 1202 to urge the partition wall of the automobile fuel tank to push out the waste liquid from the waste liquid chamber of the automobile fuel tank. The pushed out waste liquid is collected by the waste liquid chamber of the dispenser fuel tank through the waste liquid collecting route. Simultaneously, a volume of the waste liquid chamber of the dispenser fuel tank increases to push out the fuel from the fuel chamber of the dispenser fuel tank. This sequential control causes to charge the automobile with the fuel and discharging the waste liquid therefrom. It is preferable for the fuel supply port, the waste liquid discharge port, the fuel supply nozzle and the waste liquid collecting nozzle to be hermetically sealed when being connected to hermetically seal the fuel supply route and the waste liquid collecting route. It is preferable for the air is removed from the fuel supply route and the waste liquid collecting route before the fuel supply port, the waste liquid discharge port, the fuel supply nozzle and the waste liquid collecting nozzle are connected to perform the fuel supply and the waste liquid collection.

The fuel tank of the invention may include the tank an shown in one of FIGS. 4-7 and 9 other than FIG. 12. When the fuel tank as shown in FIG. 7 or 9, the spacer chamber is necessarily charged with the gaseous matter. The dispenser for the gas charge may be contained by the frame as shown in FIG. 12, or another frame other than the dispenser.

Third Embodiment

Figure 13:
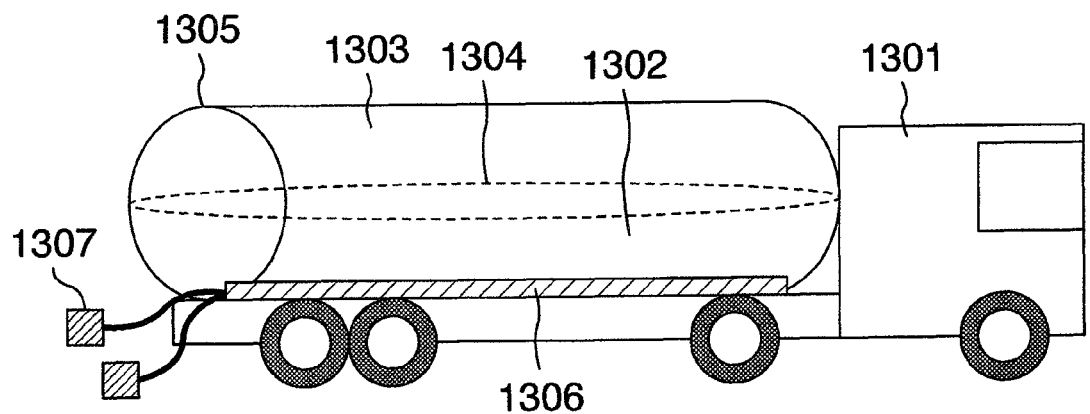
FIG. 13 is a schematic view showing a fuel transport tank lorry with the fuel tank of the invention.
Figure 14:
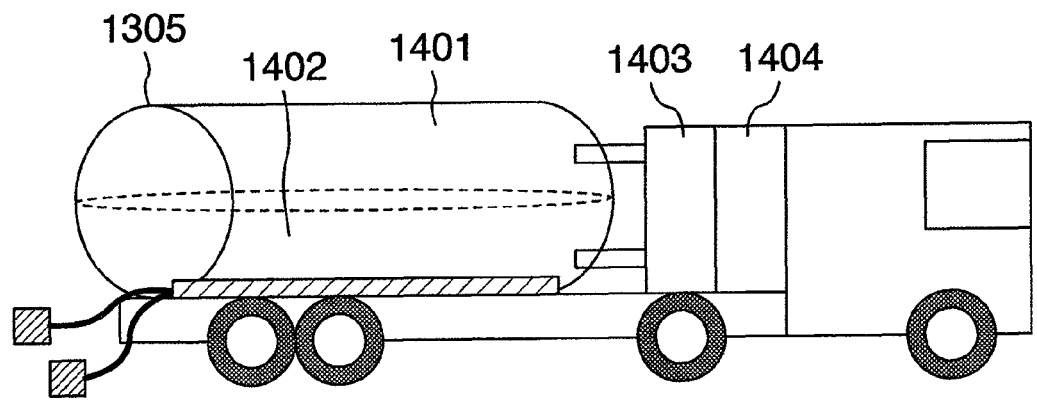
FIG. 14 is a schematic view showing a fuel transport tank lorry with the fuel tank of the invention.

FIG. 13 is a schematic view showing a tank lorry as an embodiment of the invention for transporting the fuel.

The tank lorry transports the hydrogen storage material and the waste liquid. The tank lorry includes a fuel tank 1305, a fuel supply and collect part 1306, and a moving body 1301. The fuel tank includes a frame of the fuel tank, a fuel chamber 1303, and a waste chamber 1302, and the fuel chamber and the waste chamber have respective bags. A movable partition wall 1304 is arranged between the fuel chamber and the waste liquid chamber to separately store the fuel and the waste liquid. The fuel chamber and the waste liquid chamber are preferably stacked vertically. The fuel supply and collect part includes the fuel supply nozzle, the waste liquid collecting nozzle, the pipes and the pump, and the pipes are preferably partially made of flexible material.

The fuel supply nozzle and the waste liquid collecting nozzle are hermetically sealed to hermetically seal the supply and collecting routes when being connected. The air is preferably removed from the routes before the fuel supply port and the waste liquid collecting port are connected to the fuel supply nozzle and the waste liquid collecting nozzle respectively to perform the supply and collection. The fuel tank may include the tank an shown in one of FIGS. 4-7 and 9 other than FIG. 13. When the fuel tank as shown in FIG. 7 or 9, the spacer chamber is necessarily charged with the gaseous matter. The dispenser for the gas charge may be contained by the frame as shown in FIG. 13, or another frame other than the dispenser. When the structure shown in FIG. 13 includes a hydrogen generator 1404 and a hydrogen adding device 1403, the tank lorry can act as a movable hydrogen storing and generating device.

In the embodiments 1-3 as described above, a ratio in volume between the fuel chamber and the waste liquid in the equipment using the hydrogen storage material as the fuel is variable so that the limited space of the automobile or the like can contain the maximum volume of the fuel. Further, an efficiency in supplying and collecting the fuel is increased to decrease a cost of the fuel.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A fuel tank for containing a hydrogen storing material and a product generated by dehydrogenation reaction of the hydrogen storing material, comprising,
   a fuel chamber for containing the hydrogen storing material,
   a waste chamber for containing the product, and
   a tank envelope for containing the fuel chamber and the waste chamber,
   wherein the fuel tank further comprises a partition wall fluidly separating the fuel chamber and the waste chamber from each other and being movable to change a ratio in volume between the fuel chamber and the waste chamber, wherein each of the fuel chamber and the waste chamber includes a flexible bag made of resilient material so as to be elastically deformable to define at least partially each of the fuel chamber and the waste chamber, and a valve to be hermetically closed.

2. The fuel tank according to claim 1, wherein the fuel tank comprises a plurality of the waste chambers.

3. The fuel tank according to claim 1, wherein the hydrogen storing material includes at least one of an aromatic compound including at least one of benzene, toluene, xylene, mesitylene, naphthalene, methylnaphthalene, anthracene, biphenyl, phenacelene and alkyl derivative substitution of these, an aqueous solution of ammonia, an aqueous solution of hydrazinolysis, and sodium borate.

4. The fuel tank according to claim 1, wherein hydrogen generated from the hydrogen storing material by the dehydrogenation reaction is used as a fuel for an equipment on which the fuel tank is mounted.

5. The fuel tank according to claim 1, wherein the fuel chamber is surrounded by the waste chamber.

6. The fuel tank according to claim 1, wherein the fuel tank does not include a resilient member other than the flexible bags of the fuel chamber and the waste chamber to move the partition wall.

7. A fuel tank for containing a hydrogen storing material and a product generated by dehydrogenation reaction of the hydrogen storing material, comprising,
   a fuel chamber for containing the hydrogen storing material,
   a waste chamber for containing the product, and
   a spacer chamber for containing at least one of gaseous matter and liquid other than the hydrogen storing material and the product,
   wherein the fuel tank further comprises partition walls fluidly separating the fuel chamber, the waste chamber and the spacer chamber from each other and being movable to change a ratio in volume among the fuel chamber, the waste chamber and the spacer chamber, and each of the fuel chamber, the waste chamber and the spacer chamber has a valve to be hermetically closed.

8. The fuel tank according to claim 7, wherein each of the fuel chamber, the waste chamber and the spacer chamber includes a flexible bag elastically deformable to define at least partially each of the fuel chamber, the waste chamber and the spacer chamber.

9. The fuel tank according to claim 7, wherein the hydrogen storing material includes at least one of an aromatic compound including at least one of benzene, toluene, xylene, mesitylene, naphthalene, methylnaphthalene, anthracene, biphenyl, phenacelene and alkyl derivative substitution of these, an aqueous solution of ammonia, an aqueous solution of hydrazinolysis, and sodium borate.

10. The fuel tank according to claim 7, wherein hydrogen generated from the hydrogen storing material by the dehydrogenation reaction is used as a fuel for an equipment on which the fuel tank is mounted.

11. A fuel tank for containing a hydrogen storing material and a product generated by dehydrogenation reaction of the hydrogen storing material, comprising,
   an envelope,
   a fuel chamber arranged in the envelope to contain the hydrogen storing material, and
   an inner container including a waste chamber for containing the product,
   wherein each of the fuel chamber and the waste chamber includes an elastically deformable bag to define at least partially each of the fuel chamber and the waste chamber, and one of the fuel chamber and the waste chamber surrounds the other one of the fuel chamber and the waste chamber.

12. The fuel tank according to claim 11, wherein each of the fuel chamber and the waste chamber has a valve to be hermetically closed.

* * * * *